United States Patent [19]

Hirabayashi et al.

[11] Patent Number: 4,691,521
[45] Date of Patent: Sep. 8, 1987

[54] SUPERCHARGER PRESSURE CONTROL SYSTEM FOR INTERNAL COMBUSTION ENGINE WITH TURBOCHARGER

[75] Inventors: Yuji Hirabayashi, Zushi; Masato Noguchi, Yokohama; Keiji Hatanaka, Fujisawa, all of Japan

[73] Assignee: Nissan Motor Co., Ltd., Kanagawa, Japan

[21] Appl. No.: 726,773

[22] Filed: Apr. 24, 1985

[30] Foreign Application Priority Data

Apr. 25, 1984 [JP] Japan ................................. 59-81937
Apr. 25, 1984 [JP] Japan ................................. 59-81938

[51] Int. Cl.$^4$ ............................................. F02B 37/00
[52] U.S. Cl. .................................................... 60/602
[58] Field of Search .................. 60/600, 601, 602, 603

[56] References Cited

U.S. PATENT DOCUMENTS

| | | | |
|---|---|---|---|
| 3,875,907 | 4/1975 | Wessel | 60/276 |
| 4,428,199 | 1/1984 | Moore et al. | 60/600 |
| 4,459,809 | 7/1984 | Tadokoro | 60/602 |
| 4,463,565 | 8/1984 | Rydquist | 60/602 |
| 4,509,331 | 4/1985 | Hirabayashi | 60/602 |

FOREIGN PATENT DOCUMENTS

| | | |
|---|---|---|
| 0040814 | 12/1981 | European Pat. Off. . |
| 0117193 | 8/1984 | European Pat. Off. . |
| 18522 | 2/1983 | Japan ................................. 60/602 |
| 2083135 | 3/1982 | United Kingdom . |
| 2096699 | 10/1982 | United Kingdom . |
| 2,148,391 | 5/1985 | United Kingdom . |

Primary Examiner—Douglas Hart
Attorney, Agent, or Firm—Schwartz, Jeffery, Schwaab, Mack, Blumenthal & Evans

[57] ABSTRACT

The supercharger pressure control system includes a sensor for detecting the supercharger pressure of the engine and regulates the pressure through a variable geometry device or an exhaust bypass valve. The control for the pressure regulation is carried out by comparing the sensed supercharge pressure with a target value. Any difference determined by this comparison is accumulated by a computer as an error and a basic control value is determined based on the error. Alternatively, a predetermined basic control value for the engine intake air is corrected in accordance with the error and this control value or corrected value is used to control the operation of the supercharge pressure regulator. This causes the regulator to operate in a manner responsive to variations in performance of the engine or turbocharger, thus maintaining the supercharged pressure within a permissible range of a target value.

26 Claims, 18 Drawing Figures

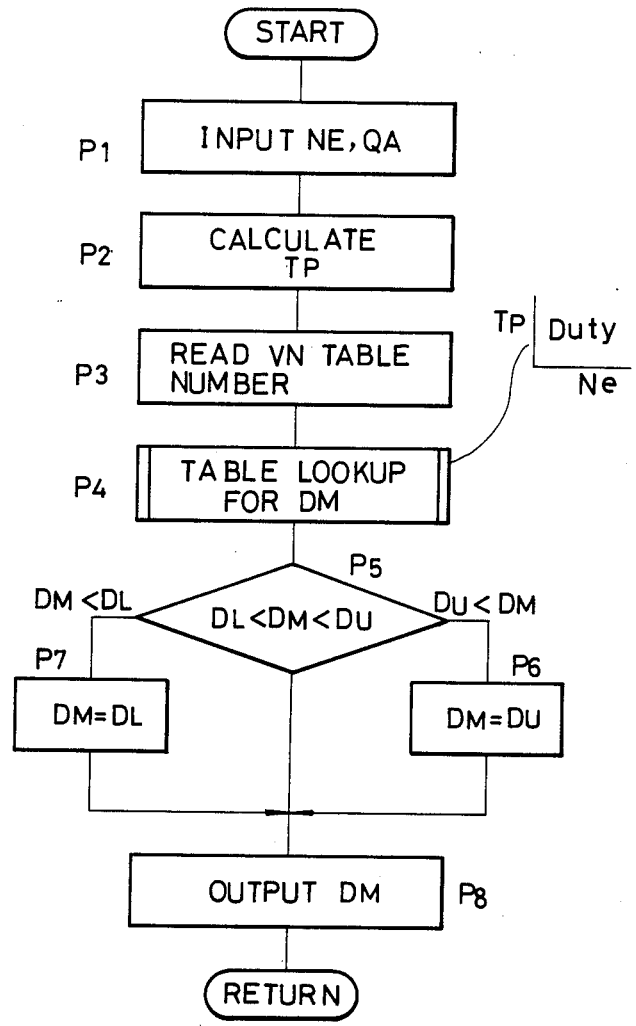

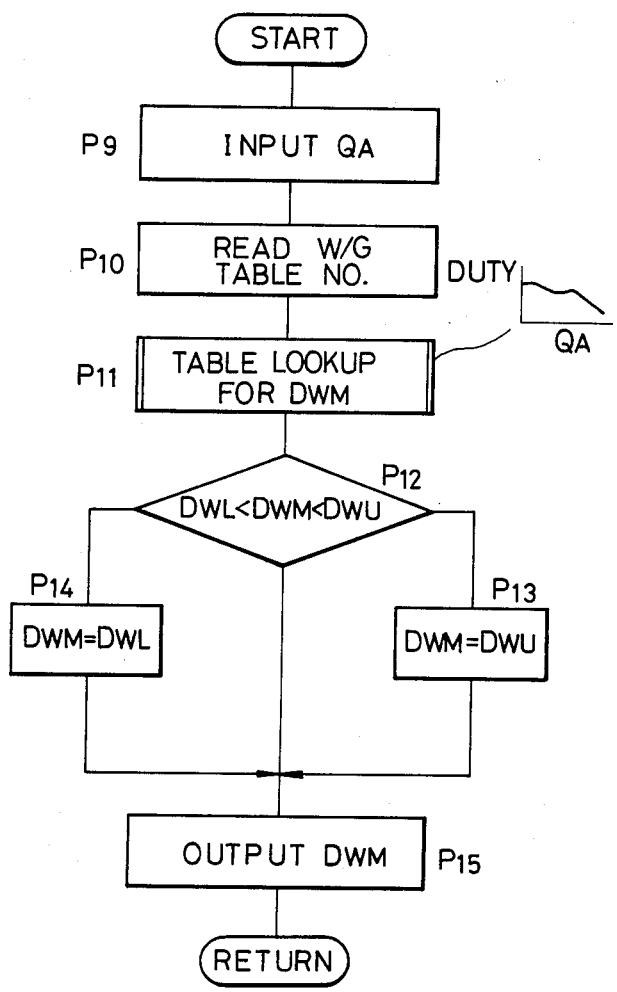

SUPERCHARGER PRESSURE CONTROL SYSTEM FOR INTERNAL COMBUSTION ENGINE WITH TURBOCHARGER

BACKGROUND OF THE INVENTION

1. Field of the Invention

The invention relates to a supercharged pressure control system for internal combustion engines with turbochargers and in particular, to a control system which enables proper control over the supercharged pressure in the presence of variations, in the operating conditions such as flow response, from engine to engine or from turbocharger to turbocharger, which includes a supercharged pressure regulator means.

2. The Related Art

It is generally recognized that a turbocharger enables a torque produced to be increased over a range from a low to a high speed by providing a variable capacity of a turbine. An example of a variable geometry turbocharger is disclosed in Japanese Publication of Unexamined Utility Model Application No. 50,310/1978 and Japanese Publication of Unexamined patent Application No. 176,417/1983. In these variable geometry turbochargers, a flap valve or swing valve is disposed in the inlet to a turbine and is controlled in accordance with a load on and the number of revolutions of an engine to define a variable geometry nozzle. In this manner, the flow rate of an exhaust gas supplied to the turbine is varied to provide a variable capacity thereof to thereby establish a high supercharged pressure over an extended interval in order to provide an increased torque output.

Specifically, the opening of the nozzle is controlled over the entire range of operation by a function generator which responds to signals representing a load on and the number of revolutions of the engine. Accordingly, if there are variations in the flow response from engine to engine, in the turbocharger response or in the operational responses of components of the control system, a supercharged pressure which is actually established will deviate from a target value and may overshoot, causing damages to the engine. To accommodate for this, it is a usual practice to provide a certain margin for these variations when establishing a supercharged pressure which does not result in damages to the engine. However, this detracts from providing an improvement in the output.

As an alternative, an arrangement employing a movable ring nozzle is also known in which the opening of the nozzle is detected and used in a feedback control to achieve a target opening, thereby preventing any variation in the supercharged pressure which may result from variations in the response. However, a specific manner of feedback control is only illustrated by the use of a potentiometer, and a fully effective arrangement is not disclosed.

Therefore, further development is still required to maintain flow flexibility and pressure variability throughout operation.

SUMMARY OF THE INVENTION

In view of the foregoing, it is an object of the invention to provide a supercharged pressure control system which establishes a supercharged pressure within a permissible range of a target value, thereby providing an improved torque output over the entire range of operation while preventing damage to an engine.

It is another object of the invention to provide a supercharged pressure control system which allows a supercharged pressure to be established within a permissible range of a target value if there are variations in the operating conditions such as flow response of an engine, turbocharger response or operating responses of components of a control system from unit to unit or with time.

It is a further object of the invention to provide a supercharged pressure control system which allows an engine to run with a proper supercharged pressure so as to develop a maximum torque output therefrom.

The above objects are achieved by a supercharged pressure control system according to the invention in which a supercharged pressure which is actually established is detected and is compared against a target value. Any difference therebetween which may result from variations in the operating conditions such as flow response of either engine or turbocharger is accumulated by a computer contained within the control system, thereby providing an error. A proper one of a plurality of predetermined basic control values for the amount of intake air to the engine is selected in accordance with the error. Alternatively, a predetermined basic control value for the intake air is corrected in accordance with the error, and such control value of corrected value is used in controlling the operation of supercharged pressure regulator means. This causes the regulator means to operate in a manner responsive to any variation in the performance of the engine or turbocharger, thus establishing a supercharged pressure which is within a permissible range of a target value.

In a first embodiment of the invention, a supercharged pressure control system comprises means for detecting an air flow rate to an engine, regulator means for regulating a supercharged pressure, detector means for detecting a supercharged pressure which is actually established, and control means for receiving an output from the detector means, the control means including a plurality of preselected control tables and being operative to select a particular one of the control tables in accordance with an accumulated difference between the detected supercharged pressure and a target supercharged pressure, a control value from the particular table being output to the regulator means.

In a second embodiment of the invention, a supercharged pressure control system comprises means for detecting an air flow rate to an engine, regulator means for regulating a supercharged pressure, detector means for detecting a supercharged pressure which is actually established, and control means for receiving an output from the detector means and being operative to correct a predetermined basic control value in accordance with an accumulated difference between the actual supercharged pressure and a target supercharged pressure to provide an output control value delivered to the regulator means.

BRIEF DESCRIPTION OF THE DRAWINGS

FIGS. 3A to 3D are a series of flow charts illustrating programs used in the control system;

DETAILED DESCRIPTION OF EMBODIMENT

Figure 1:
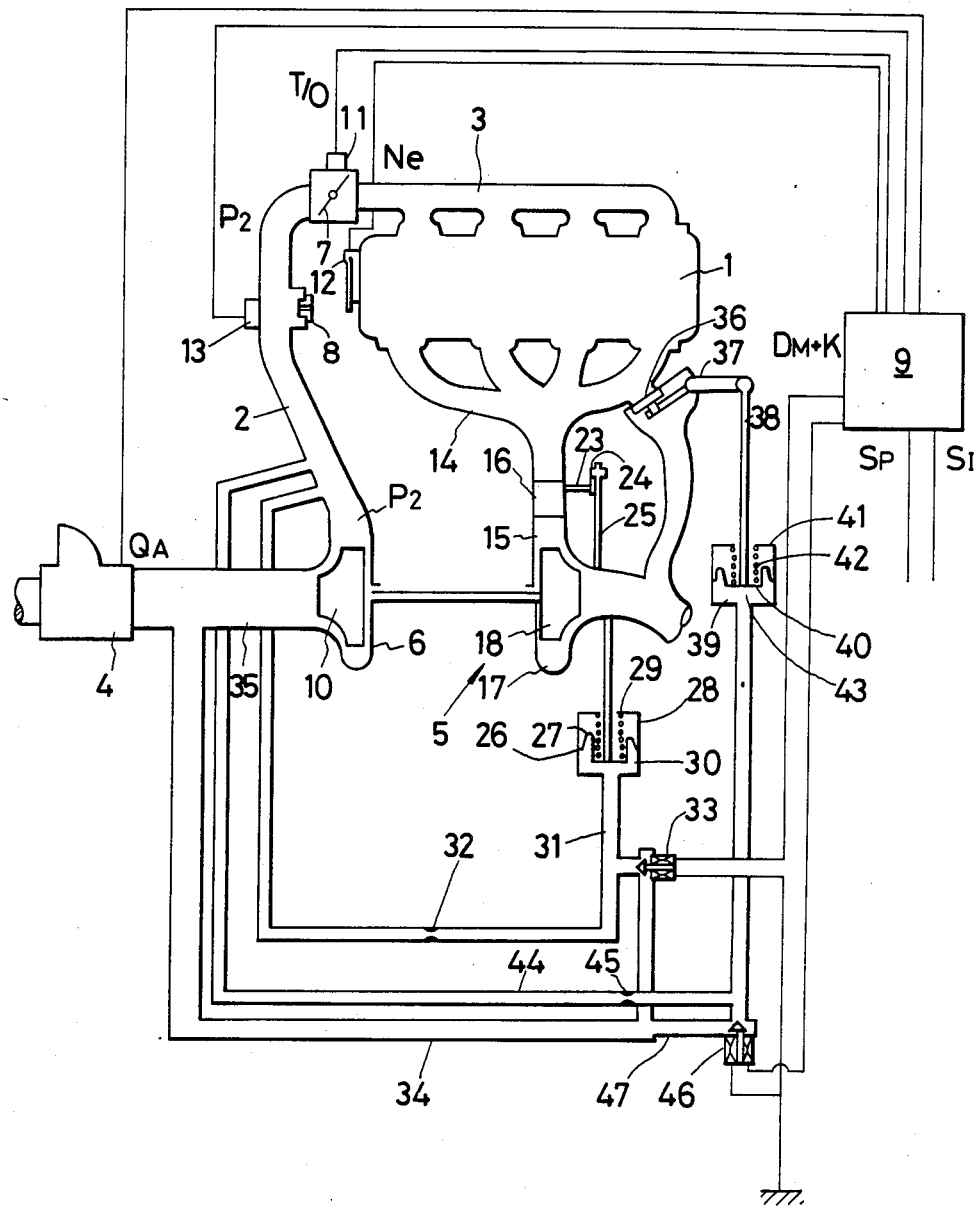
FIG. 1 is a schematic diagram illustrating the general arrangement of one embodiment of the invention.

The invention will now be described as applied to a turbocharger which includes a waste gate valve W/G (exhaust gas bypass mechanism) and variable geometry mechanism which allow a supercharged pressure to be regulated. Referring to FIG. 1, the engine shown includes a body 1 into which intake air is introduced through an intake pipe 2 and an intake manifold 3. Operatively associated with the intake pipe 2 are an airflow meter 4, a compressor chamber 6 of a turbocharger 5, a throttle valve 7 and a relief valve 8. The airflow meter 4 determines the amount of intake air and provides a signal $Q_A$ indicative of such amount which is supplied to control unit or control means 9. A compressor 10 is housed within the compressor chamber 6 and pressurizes the intake air to a supercharged pressure $P_2$ which is then distributed into individual cylinders through the intake manifold 3 after its flow is controlled by the throttle valve 7. The opening of the throttle valve 7 is detected by a valve opening sensor 11 which delivers a signal T/O indicating the opening to the control unit 9. Also the number of revolutions of the engine Ne is detected by a crank angle sensor 12, which represents a means for detecting the number of revolutions of the engine, to be delivered to the control unit 9. Finally, an intake air pressure sensor 13 detects the pressure of the intake air or the supercharged pressure $P_2$ and delivers a corresponding voltage signala to the control unit 9.

An exhaust gas from the engine is collected by an exhaust manifold 14 and is displaced through an exhaust pipe 15. It will be noted that variable geometry means 16 and a turbine chamber 17 which permits a supercharged pressure to be regulated are disposed within the exhaust pipe 15. A turbine 18 which is coaxial with the compressor 10 is housed within the turbine chamber 17, and the exhaust gas flow (speed) to the turbine 18 is changed by controlling a nozle, to be described later, of the variable geometry means 16.

Figure 2:
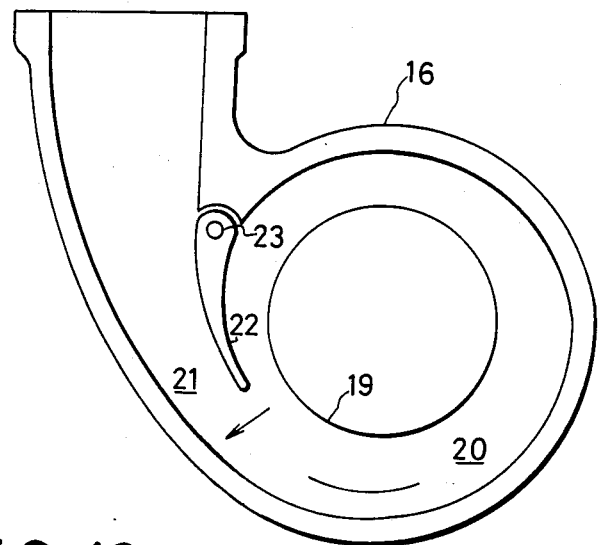
FIG. 2 is a schematic cross section of variable geometry means which enables a supercharged pressure to be regulated.

Referring to FIG. 2, the variable geometry means 16 is schematically shown, with the turbine omitted from illustration. spacifically, it includes a central curcular portion 19 in which the turbine is housed and which is surrounded by a scroll 20 having a progressively decreasing area, with an inlet 21 of the scroll being defind as a throat in which a movable flap valve 22 is pivotally mounted on a pin 23, whereby the exhaust gas inlet 21 defines a variable nozzle VN).

Returning to FIG. 1, the pin 28 of the variable geometry means 16 is connected through an arm 24 and a rod 25 to the diaphragm 27 of an actuator 26. As shown, the actuator 26 comprises atmospheric chamber 28 in which a spring 29 is disposed and a positive pressure chamber 30, which are separated by the diaphragm 27. The spring 29 acts to depress the diaphragm 27 and to pull the rod 25 down to thereby close the variable geometry nozzle. The positive pressure chamber 30 is connected by a conduit 31 to the intake pipe 2 at a point downstream of the compressor 10, thus introducing the supercharged pressure $P_2$.

A fixed restriction 32 is formed in the conduit 31, and a point between the restriction 32 and the actuator 26 is connected through a solenoid valve 33 and a conduit 34 to a point upstream of the compressor 10, or to an intake pipe 35 which is disposed between the compressor 10 and the airflow meter 4. The solenoid valve 33 is subject to a duty control by a signal fed from the control unit 9, whereby the supercharged pressure $P_2$ leaks into the intake pipe 35 or the atmosphere. When the magnitude of a duty value DM increases, the solenoid valve 33 remains open for an increased length of time, whereby the supercharged pressure or the positive pressure $P_2$ within the chamber 30 decreases, causing a downward movement of the rod 25 to drive the nozzle toward its closed position.

Operatively associated with the exhaust manifold 14 is variable geometry means in the form of an exhaust gas bypass valve 36, which is connected through a bell crank 37 and a rod 38 to the diaphragm 40 of another actuator 39. The actuator 39 includes an atmospheric chamber 41 in which a spring 42 is disposed and a positive pressure chamber 43, which are separated by the diaphragm 40. The spring 42 acts to urge the diaphragm 40 into the positive pressure chamber 43 and to pull the rod 31 down, thus driving the valve 36 in a direction to close it. The positive pressure chamber 43 is connected through a conduit 44 to the intake pipe 2 with a restriction 45 formed therein, through which the supercharged pressure $P_2$ is introduced. A solenoid valve 46 is disposed in the conduit between the restriction 45 and the actuator 39 to permit the conduit 44 to be connected to the intake apipe 35 or the atmosphere through a conduit 47. The solenoid valve 46 is subject to a duty control by a signal fed from the control unit 9. If the magnitude of the duty value increases, the positive pressure within the actuator 39 is reduced, thus driving the bypass valve 36 in a direction to close it.

The control unit 9 is formed by a microcomputer which essentially comprises a microprocessor, a memory and an interface. Various signals from the airflow meter 4, the throttle valve opeining sensor 11, the crank angle sensor 12 and the intake pressure sensor 13 are input to the interface. Of these signals, analog signals are converted into corresponding digital signals by means of an analog-to-digital (A/D) converter. The memory stores a variety of data which is required to perform arithmetic operations charried out by the microprocessor. In addition, it stores a portion of data which is fed externally. The microprocessor operates to calculate the amount of fuel to be injected, the injection timing and the fire timing in accordance with a program stored within the memory to determine an injection signal $S_I$ and a fire signal $S_P$ which are appropriate to the operating condition of the engine. In addition, the microprocessor calculates suitable duty values for the solenoid valves 33 and 46, which are output from the interface as control signals $D_M$.

The operation of the described arrangement will now be described with reference to flow charts shown in FIGS. 3A to 3D. It is to be understood that in these Figures, $P_1$ to $P_{15}$ represent sequential steps in the respective flow charts.

The calculation which proceeds through each flow chart takes place one per revolution of the engine or for each fixed time interval. Once the program starts, a JOB control determines the sequence of execution of jobs, including an error 1 and 2 calculation routine, a table number decision routine which represents a subroutine of VN duty calculation routine, and an exhaust gas bypass valve duty calculation routine.

Figure 3B:
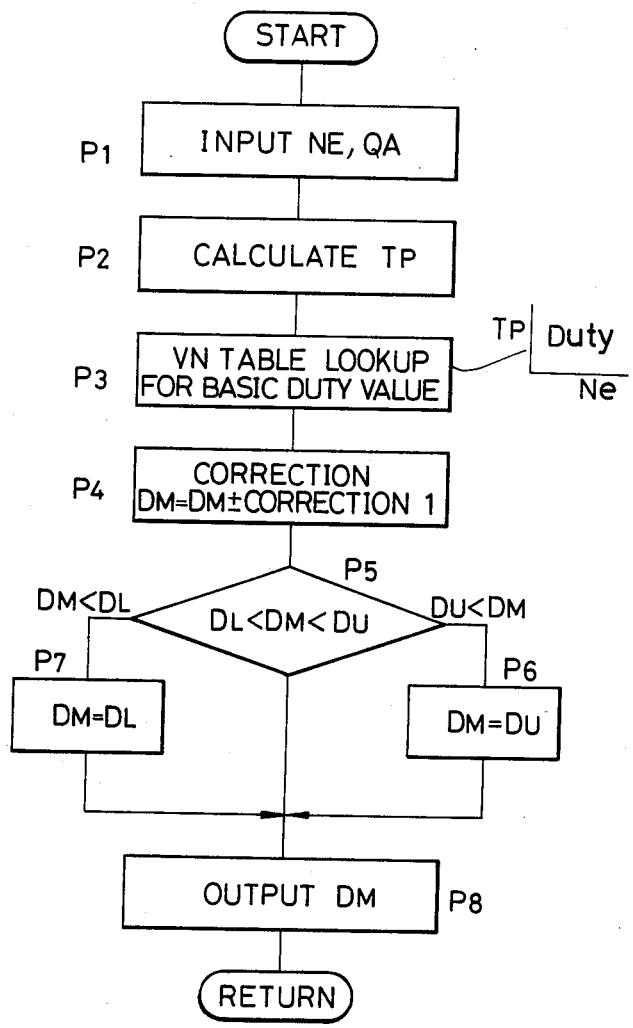

(1) VN duty calculation routine: FIGS. 3A and 3B.

In FIG. 3A, digital equivalents of the number of revolutions of the engine Ne and the air flow rate $Q_A$ are input at step $P_1$, and the air flow rate Tp per revolution of the engine is calculated at step $P_2$. The following step $P_3$ reads a table number which is determined in accordance with an accumulated difference between a target supercharged pressure and an actual supercharged pressure detected, in a manner to be described later. At step $P_4$, a table lookup operation occures to a table having the number determined in the manner mentioned above in order to derive a duty value which depends on the values of Ne and Tp. Because the table contains a finite number of values of Ne and Tp, an interpolation is effected for values of these variables which are intermediate the contained values within the table, thus determining a basic duty value $D_M$.

To take into consideration a time lag in the operation of the solenoid valves and the possibilities of any malfunctioning in the calculation unit, a decision is made at step $P_5$ to see if $D_M$ is between an upper limit $D_U$ and a lower limit $D_L$. If $D_M$ is greater than $D_U$, the magnitude of $D_M$ is limited to the upper limit at step $P_6$. On the contrary, if the magnitude of $D_M$ is less than $D_L$, the value $D_M$ is limited to the lower limit at step $P_7$. The magnitude of $D_M$ thus determined is stored in a memory at step $P_8$. The stored value in a memory is used in a timer unit (not shown) to determine the duty value which is to be fed to the solenoid valve, with the result being fed through the I/O interface to control the operation of the solenoid valve.

In the present example, a VN control valve which is used in the regulation of the supercharged pressure is derived by a mapping to the table in accordance with the number of revolutions of the engine Ne and the air flow rate Tp per revolution of the engine. However, since the supercharged pressure is substantially proportional to the air flow rate, the VN control value may be derived only in accordance with the air flow rate.

In FIG. 3B, the program proceeds in substantially the same manner as that indicated by the flow chart in FIG. 3A except that a table contains a number of basic duty values for selected values of Ne and Tp, and a particular duty value is determined at step $P_3$ by a lookup operation to the table and that at step $P_4$, a correction value which is determined in accordance with the accumulated difference between a target supercharged pressure and an actual supercharged pressure detected, to be described later, is added to or subtracted from the basic control value to determine the magnitude of the duty value $D_M$.

Figure 3D:
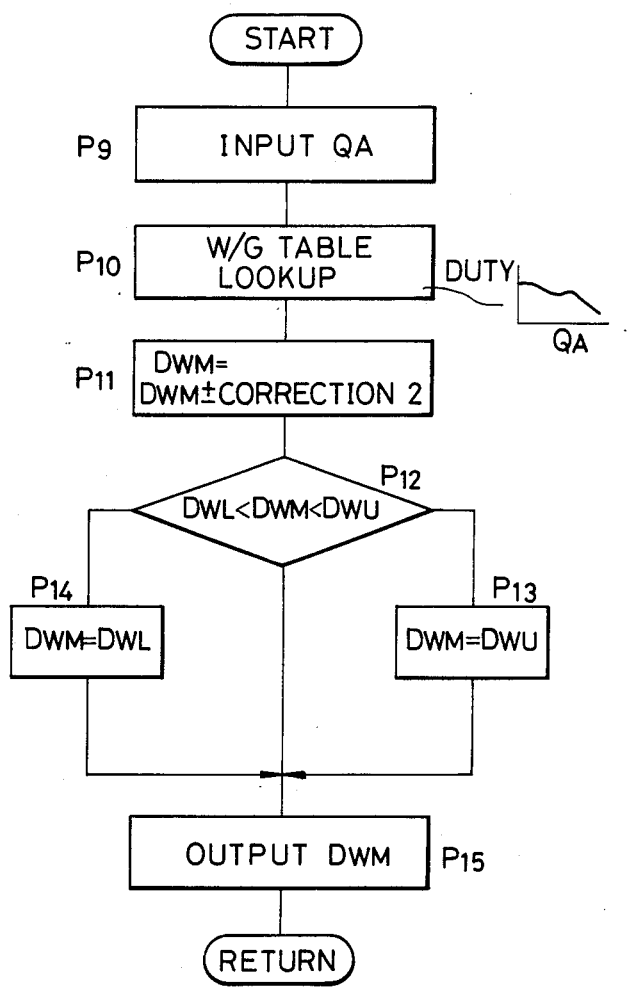

(2) Exhaust gas bypass value duty calculation routine: FIGS. 3C and 3D.

Referring to FIG. 3C, the digital equivalent of the air flow rate $Q_A$ is input at step $P_9$, and a table number is determined at step $P_{10}$, in accordance with the accumulated difference between a target supercharged pressure and an actual supercharged pressure detected, in a manner to be described later. At step $P_{11}$, a particular duty value which corresponds to $Q_A$ is read by a lookup operation from the table having the number determined at step $P_{10}$. Since the table contains a finite number of values of $Q_A$ and corresponding duty values, a linear interpolation is made for values of $Q_A$ which are not contained in the table. In this manner, a basic duty value $D_{WM}$ is determined.

At step $P_{12}$, a decision is made to see if the magnitude of $D_{WN}$ is between its upper limit $D_{WU}$ and its lower limit $D_{WL}$ to take into consideration a time lag in the operation of the solenoid valve and the possibility of any malfunctioning in the calculation unit, generally in the same manner as is done for VN. If the magnitude $D_{WM}$ us greater than $D_{WU}$, the magnitude of $D_{WM}$ is limited to its upper limit at step P13. On the contrary, if the magnitude of DWM is less than DWL, its magnitude is limited to the lower limit at step $P_{14}$. The basic value of $D_{WM}$ determined in this manner is stored in a memory at step $P_{15}$, and this value is used in a timer calculation unit, not shown, to calculate the duty value to be fed to the solenoid valve which is fed through the I/O interface to control the operation of the solenoid valve.

FIG. 3D shows the flow chart of a routine which is a modification of that shown in FIG. 3C and which corresponds to the calculation routine for the VN duty value shown in FIG. 3C. The routine is essentially the same as that shown in FIG. 3C except that a particular duty value for a selected value of $Q_A$ is read from a table containing a plurality of such values, by a lookup operation, at step $P_{10}$ and that at step $P_{11}$, a correction value which is determined in accordance with an accumulated difference between a target supercharged pressure and an actual supercharged pressure detected, in a manner to be described later, is added to or subtracted from the basic duty value to determine the magnitude of $D_{WM}$, which is then stored.

Figure 4:
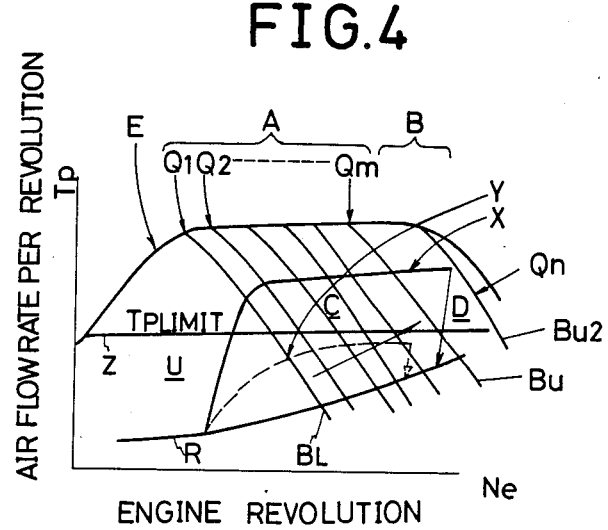
FIG. 4 is a graphical illustration of tables which are used in the operation of the control system.

FIG. 4, where the abscissa represents the number of revolutions of the engine Ne and the ordinate the air flow rate Tp per revolution of the engine, illustrates the manner in which an actual control table is constructed. In FIG. 4, a curve E represents the fully open condition of the throttle valve. A curve $B_L$ represents a constant value of supercharged pressure $P_2$, for example, of 350 mmHg, for the fully closed condition of VN while a curve Bu represents the given value of the pressure $P_2$ for the fully open condition of VN. A region U is to the left of the curve $B_L$ and represents a variable VN region. A region U is shown to the left of the curve $B_L$ and represents the fully closed VN since the supercharged pressure $P_2$ cannot reach the given value.

The exhaust gas bypass valve is operated in a region D which extends from a point above or below Bu, depending on the design, to the fully open throttle valve condition E. In FIG. 4, reference characters Q1 . . . Qu represent curves indicative of uniform air flow rates of different levels. A plurality of tables which contain control duty values for the variable geometry means are provided so as to correspond to selected values of Ne and Tp or the air flow rate $Q_A$ in the region C, with certain offsets therebetween. Similarly, a plurality of tables are provided which contain control duty values for the exhaust gas bypass valve in the region D.

(3) Table number decision routine

The manner in which a particular table number is determined in accordance with a difference between a target supercharged pressure and an actual supercharged pressure detected will now be described. In FIG. 4, a reference character R represents a road load (R/L) curve, X an accelerated run curve which represents a rapid acceleration from a point on the curve R, Y another accelerated run curve corresponding to a slow acceleration and Z represents the lower limit of Tp. The level of a preset supercharged pressure presents a problem when a rapid acceleration is made, or when the opening of the throttle valve is large and a pressure differential thereacross is reduced, corresponding to the curve X. There is no problem whatsoever for the dotted line curve Y if there are variations. Specifically, the level of the supercharged pressure has influences upon the engine output and the knocking condition, and hence it is important to detect a deviation from the tareget supercharged pressure under such running condition. At this end, a lower limit "Tp Limit" (curve Z), representing a load, is used to provide a sampling area for data detected (see step F13 of FIG. 6).

The operating region from the curve $B_L$ representing the fully closed VN, to Bu or further extending to a curve Bu2 in the W/G operating region is divided into a suitable number of segments, for example, (n−1) segments. The curves Q1, Q2, . . . Qm, Qn, having an air flow rate which decreases with an increasing speed of the engine, represent uniform supercharged pressure or uniform flow rates of different levels. It will be noted that VN has a uniform opening in the region between $B_L$ and Bu.

Figure 5:
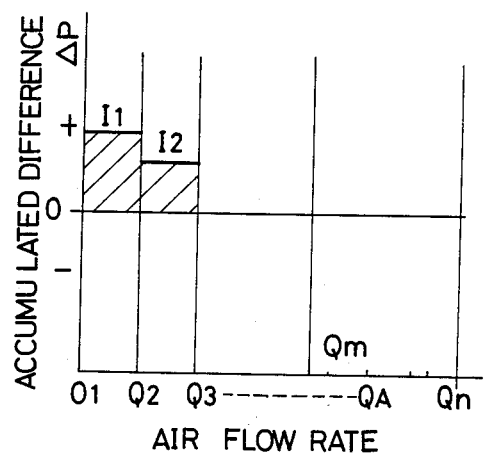
FIG. 5 is a diagram illustrating the manner of accumulating errors.
Figure 6:
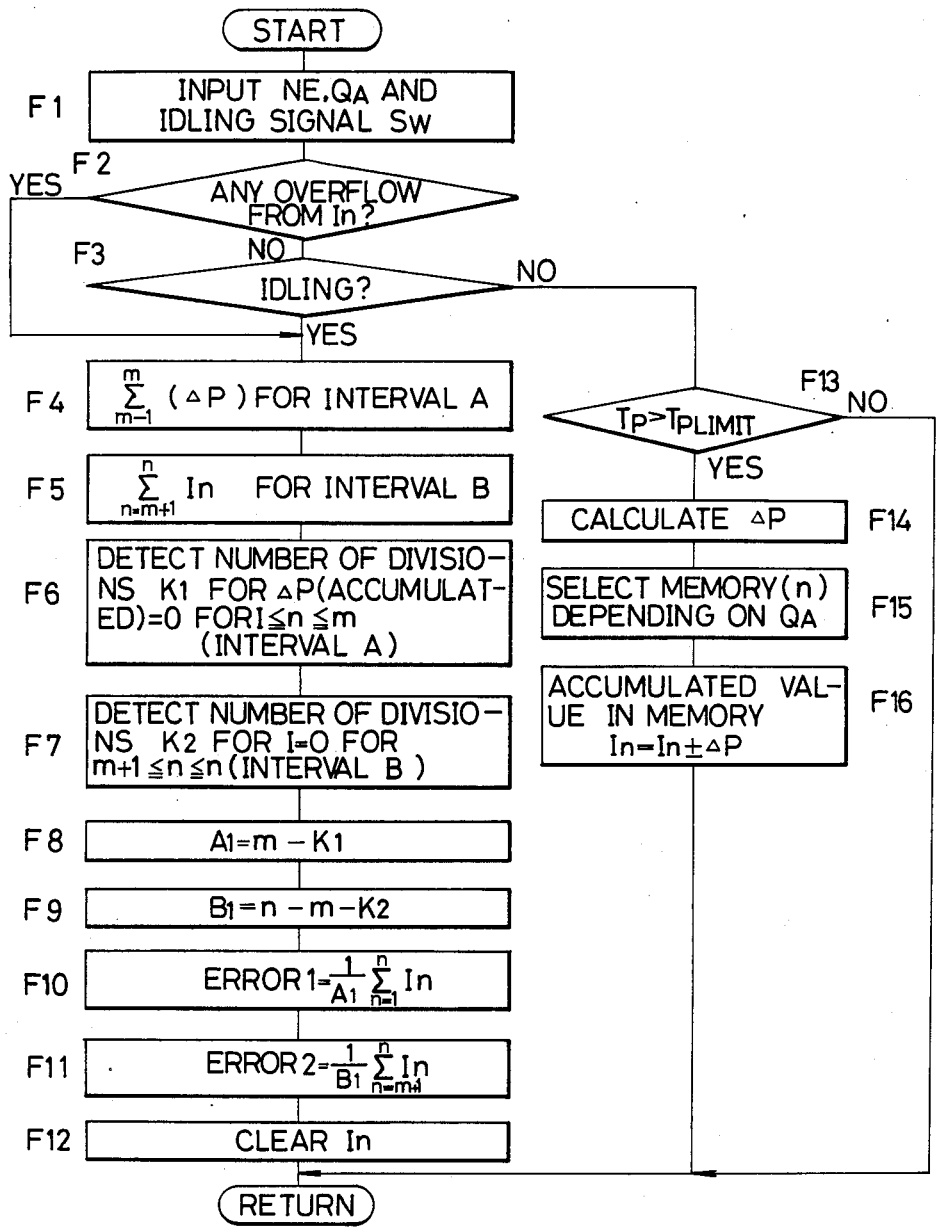
FIG. 6 is a flow chart for an error accumulation routine.

In a region above the curve Z and located between $B_L$ and Bu, an analog equivalent of a difference between a target supercharged pressure and an actual supercharged pressure detected is fed to an A/D converter to provide a digital equivalent, the value of which is accumulated for each air flow rate region in storage (steps F14 to F16 of FIG. 6). The result is illustrated in FIG. 5.

In FIG. 5, the abscissa represents the air flow rate $Q_A$ while the ordinate represents the accumulated value P (difference between a target and an actual supercharged pressure). $I_1$ and $I_2$ represent accumulated values for respective air flow rate ranges Q1 and Q2, respectively. Either a positive or a negative sign is applied depending on whether the actual supercharged pressure is greater than or less than the target value.

When the throttle valve is closed rapidly, the supercharged pressure increases rapidly, causing the likelihood that an inadvertent accumulating operation may result. Thus, the accumulating operation is prevented, for an opening of the throttle valve which is less than a given value, by turning a throttle valve switch off which may be in common with or separate from an idling switch. In this manner, no counting results when the throttle valve is fully closed (see step F3 in FIG. 6). In this manner, a mean value of error is calculated for the intervals A and B (steps F4 to F11 of FIG. 6).

If the accumulated value exceeds the capacity of a storage, it is apparent that a control table is not appropriate. Hence, the accumulating operation is interrupted at that point, and the table being used is reconsidered. In this manner, a learning control is effected for each variety of engines.

FIG. 6 shows a flow chart which is used to perform the described calculation, namely, the calculation of a mean value (error) of a deviation of an actual supercharged pressure detected from a target supercharged pressure, which calculation is made seperately for VN control region (interval A) and the exhaust gas bypass control region (interval B). Specifically, a subroutine beginning with step F13, and shown on the right side, accumulates "In" values while a subroutine beginning with F4, shown on the left side, calculates the magnitude of an error. An error 1 represents a mean value of error in the interval A and an error 2 represents a means value of error in the interval B. It should be understood that the accumulated value "In" is cleared each time the engine is returned to its idling condition or for each overflow from the memory capacity (see steps F12 and F2).

Figures 7A, 7B:
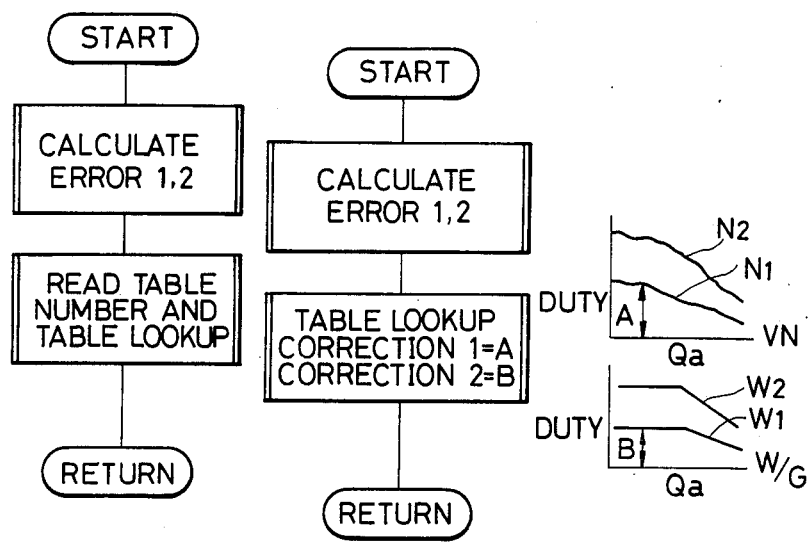
FIG. 7A is a flow chart of a table number lookup operation.
FIG. 7B is a flow chart of a correction routine.

FIG. 7A represents a routine which is used to provide a lookup operation to the table number corresponding to an error. Specifically, for high values of an error, a table number containing duty values of increased values, for example, is selected. On the other hand, a table number containing reduced duty values is selected for small values of an error. Such selection is made for error 1 and for error 2. The selected table number is stored in the memory.

Thus it will be understood that a table number as a mean evaluation or providing a high accuracy is selected based on an error, by a learning control, in response to an accumulated difference between a target value and an actual value for each region. A duty value is then determined on the basis of table number in order to remove the error. Such value is used to control the solenoid valve 33 or 46 (FIG. 1) to operate VN or W/G. Accordingly, if the performance varies from engine to engine, the supercharged pressure can be maintained within a permissible range.

FIG. 7B shows a routine of a lookup operation for a correction value corresponding to an error, as an alternate embodiment. The lookup operation takes place with respect to a pair of correction curves N1 and N2, which are used for large values and small values of an error, respectively. In the illustration, duty values A and B for VN and W/G, respectively, are determined from such correction curves in respect to a specific value of $Q_A$. However, to obtain a duty values for VN, a correction table may be utilized to determine a duty value in accordance with Ne and $Q_A$, generally in the same manner as shown in FIG. 4. The correction value thus selected is stored in the memory. In this manner, a correction value as a mean evaluation or as providing a high reliability is selected on the basis of an error, by a learning control, in response to an accumulated difference between a target and an actual value for each region. This correction value is used to determine a corresponding duty value which acts to remove the error.

(4) Control in a region where VN and W/G overlap

Where the VN operating region and the W/G operation region overlap each other, it is necessary that the duty values for the respective regions be changed in an interrelated nammer. By way of example, when a supercharged pressure is too low and it is determined to utilize a table number or a correction curve which allows the supercharged pressure to increase, as a result of a decision in the VN region, operating the W/G valve in the opening direction does not result in an increase in the supercharged pressure if the setting in the W/G region is maintained constant. Rather, the efficiency will be degraded by an amount corresponding to the partial closure of VN, resulting in a disadvantage that the torque will be reduced.

Figure 8:
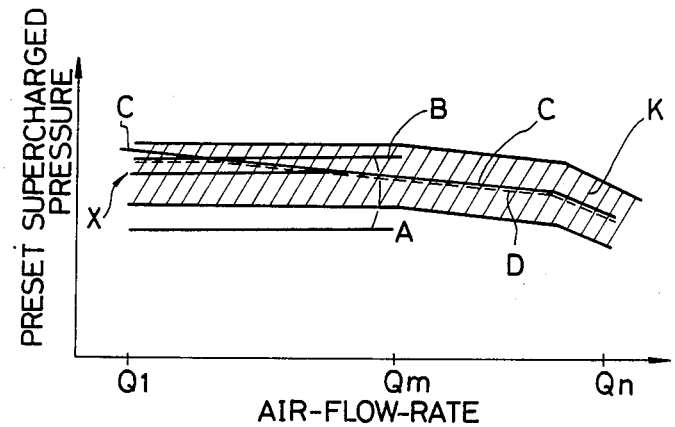
FIGS. 8 and 9 graphically illustrate the manner of modification.
Figure 9:
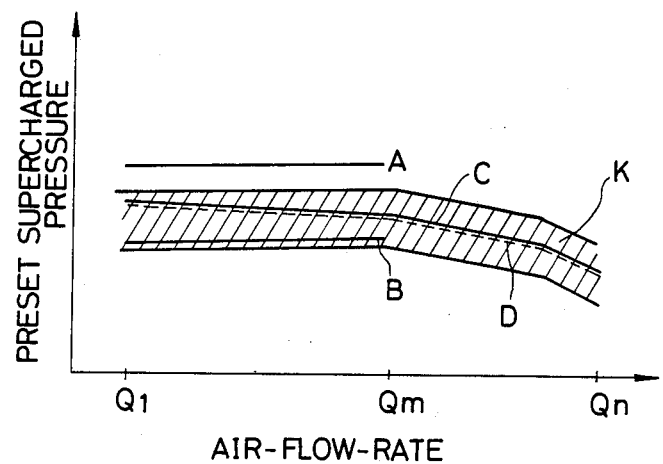
Figure 10:
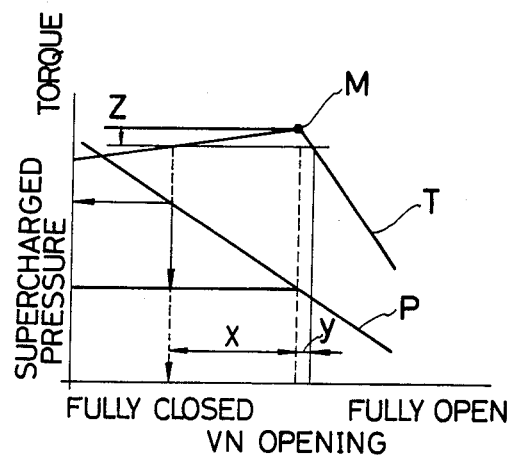
FIG. 10 graphically shows the torque and the supercharged pressure plotted against VN opening.

This aspect will be considered in more detail with reference to FIGS. 8 to 10. It is assumed in FIG. 8 that Q1 to Qm are located in both VN and W/G control regions while Qm to Qn are located solely in the W/G operating region. Assuming that a present supercharged pressure for VN is located at a line A, a deviation between the line and a target supercharged pressure X is not contained within the permissible range K. Accordingly, either the table number or the correction curve is changed to bring the preset supercharged pressure to a line B. In this instance, the W/G operation occurs according to a line C, and hence the supercharged pressure is influenced by the line C, resulting in a supercharged pressure indicated by a line D shown in broken lines and which is located below the line B.

By contrast, if an initial setting for VN is as high as is located on a line A in FIG. 9, and hence either a table number or a correction curve is changed to establish a setting in accordance with a line B, the apparent supercharged pressure will be contained within the permissible range K. However, since VN is excessively closed, if the W/G valve is used to maintain the supercharged pressure constant, the supercharged pressure will be lower than a broken line D, resulting in a reduction in the torque.

FIG. 10 graphically illustrates the response in terms of a VN opening which results in a same amount of torque reduction Z. In this Figure, T represents a torque curve and P a supercharged pressure characteristic curve. A point M represents the point of maximum torque. It will be seen from this Figure that an operation in the relatively closed area x located to the left of the maximum torque point will be more advantageous than an operation in the other or open side y, since then a reduction in the torque which occurs within VN permissible range is reduced. Accordingly, the table number lookup routine which determines a table number or correction curve in practice is arranged to satisfy the following requirements:

1. An angle is chosen for VN so that it is open to the greatest degree within the permissible range;
2. An angle is chosen for W/G so that it is closed to the maximum degree within the permissible range.

Figure 11:
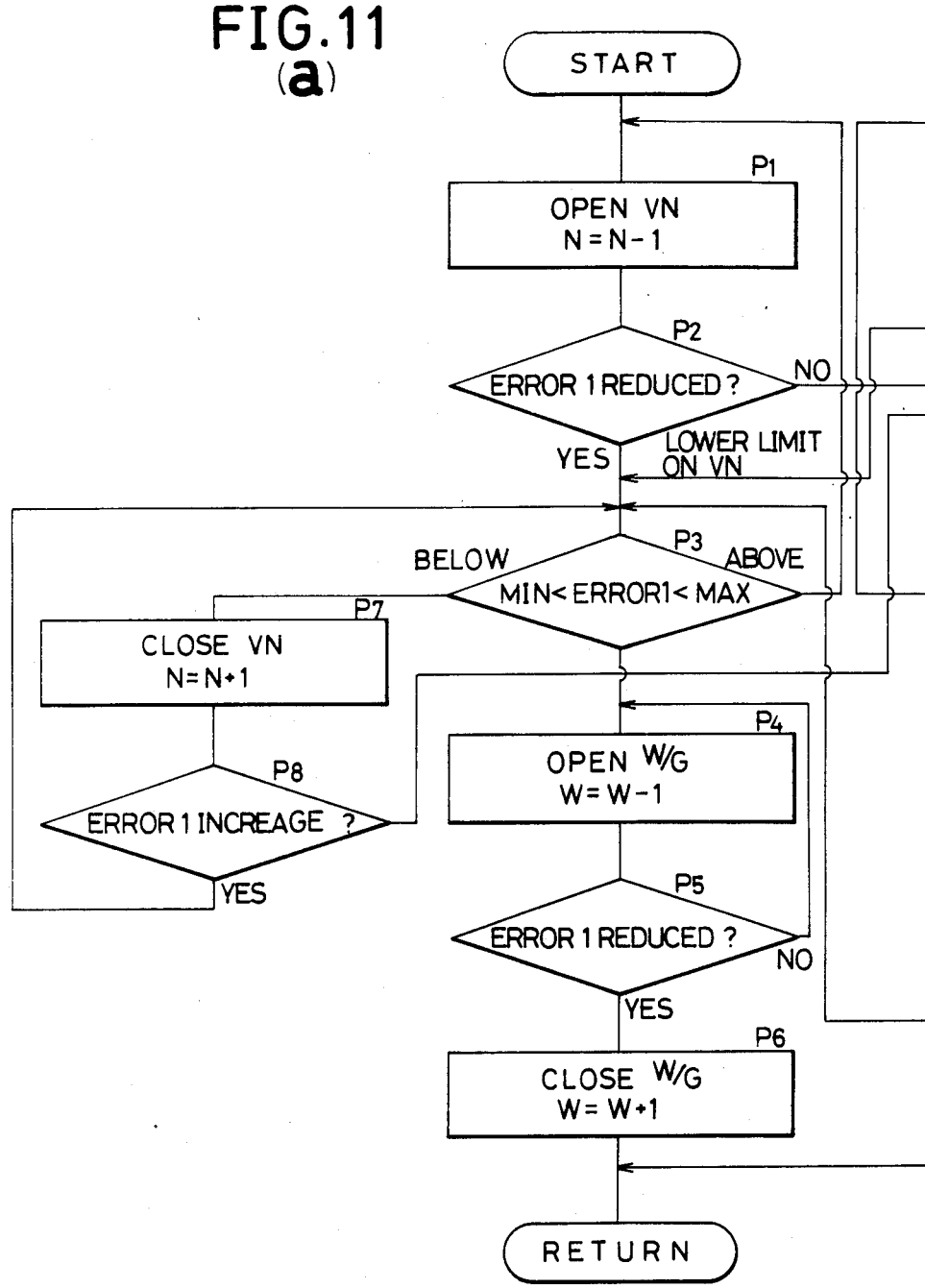
FIG. 11(a) and 11(b) is a flow chart of a correction lookup table routine.
Figure 11:
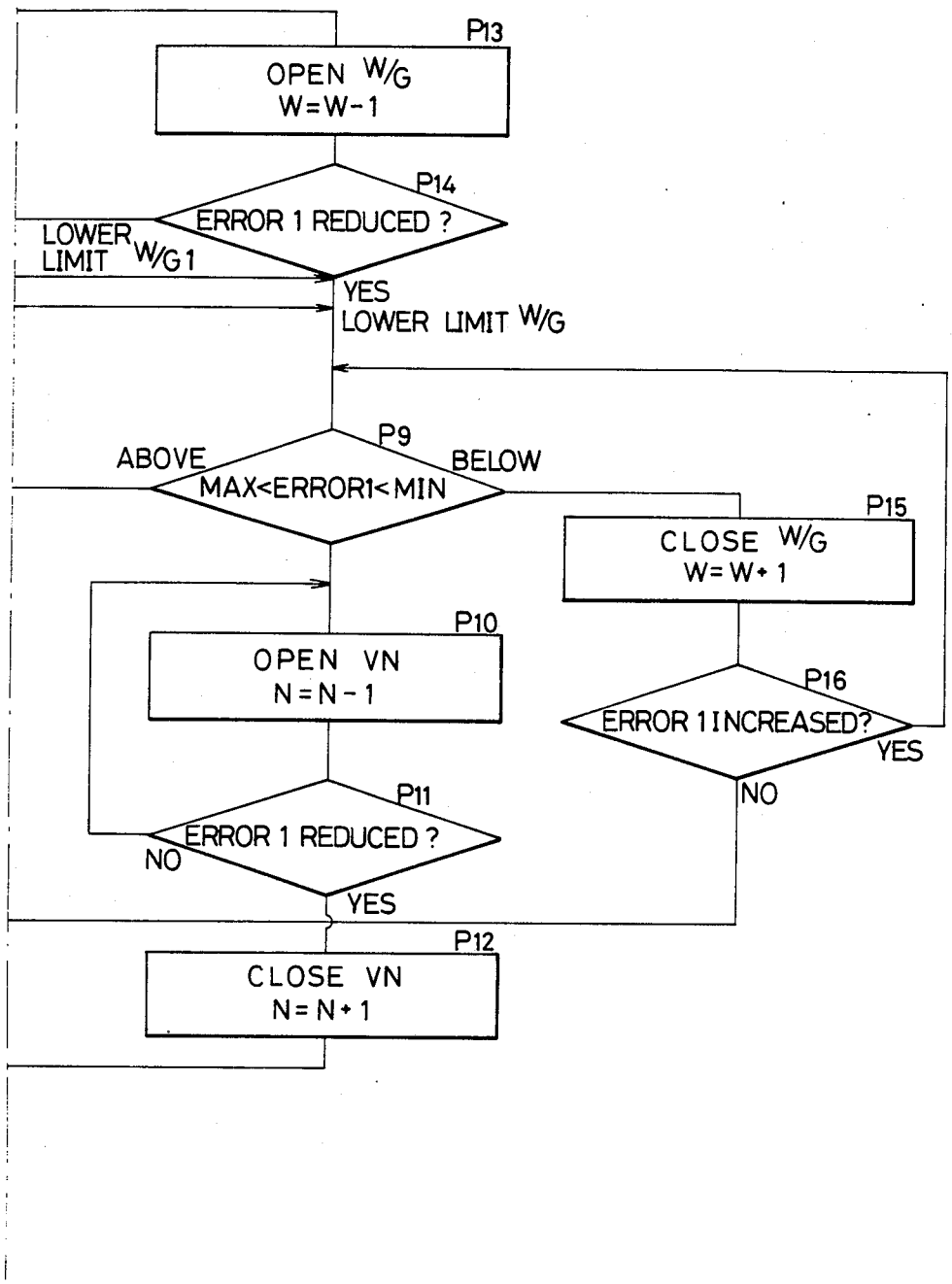

FIGS. 11(a) and 11(b) are a flow chart of a table number lookup routine which is used where the VN operating region and the W/G operating region overlap each other. At step P1, the VN opening is once increased slightly. At this end, a table number or a correction curve having a number (N−1) is used when N represents a current table number or correction curve.

Figure 12:
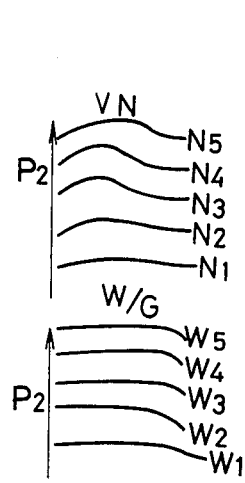
FIG. 12 graphically illustrates correction curves.

It is assumed that control tables or correction curves having number N1 to Nn are provided, with a table carrying a lesser number containing duty values for reduced supercharged pressure or correction values. Similarly, table W1 to Wn are provided for W/G. Examples of a plurality of correction curves for VN and W/G are graphically shown in FIG. 12.

At step P2, a decision is made to see if an error 1 has reduced as a result of using a table or a correction value which provide a slightly increased VN opening (or reduced supercharged pressure). When the lower limit of the supercharged pressure during the running is determined by VN, the supercharged pressure will decrease independently from a setting for W/G, and hence the error 1 decreases, whereby the program proceeds to step P3.

At step P3, a decision is made to see if the error 1 is within the permissible range. If it is within the permissible range, the W/G opening is slightly increased at step P4, and the result is determine at step P5 to see if the error 1 decreases in order to determine whether or not a further opening of W/G is appropriate. This operation scheme is employed because it is desirable to maintain as high a W/G opening as possible within the permissible range where both VN and W/G operations occur simultaneously. However if the W/G opening is increased excessively to exceed the permissible range, this will disable the function of preventing an overshoot when VN is operated alone as well as the W/G function to provide an emergency remedy in the event VN control system malfunctions. Accordingly, the W/G operation occurs as close to the permissible range as possible.

In other words, because an apparent supercharged pressure is established in accordance with a VN or W/G setting whichever is the lower, if the apparent pressure remains within the permissible range, the operation brings VN to its maximum opening, as shown in FIG. 10, while minimizing the operation of W/G. Hence, VN is once opened, and decision is made to see if the prevailing lower limit is determined by VN or W/G control.

If it is found at step P2 that the error 1 has not decreased, this means that the lower limit is determined by the W/G control. In this instance, a decision is made at step P9 to see if the error 1 is within its permissible range. If it is, the VN opening is increased to its limit, by cycling through steps P10, P11 and P12.

If it is found at P9 that the error 1 has gone outside of the permissible range, steps P13 and P14 increase the W/G opening and make a decision to see if it is within the permissible range (at step P3) when it has reduced below VN opening.

Conversely, if it is found at step P9 that the error 1 is less than the permissible range, steps P15 and P16 increase the W/G opening beyond the VN setting, and then a decision is made at step P3 to see if the VN setting is within the permissible range.

Figure 13:
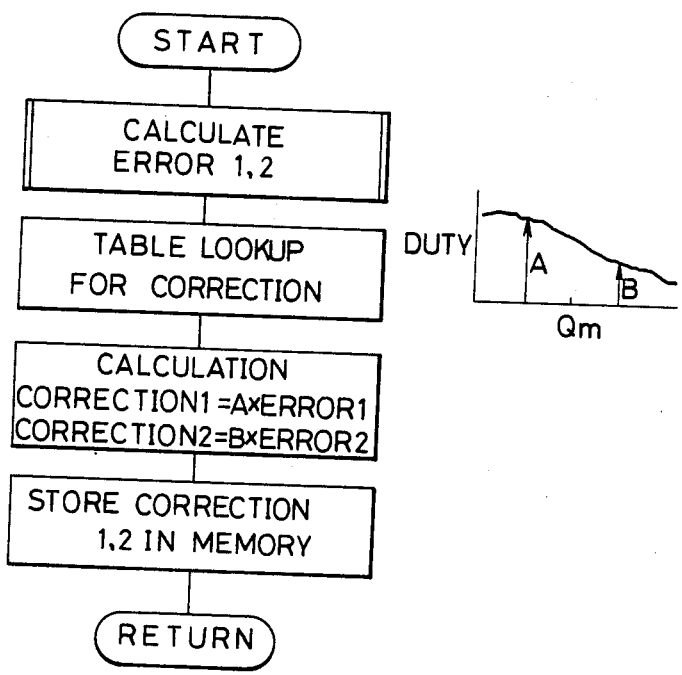
FIG. 13 is a flow chart of a correction routine which may be utilized in another embodiment of the invention.

FIG. 13 illustrates another embodiment. In this embodiment, a correction value to the basic duty vale for both VN and W/G openings comprises a mean deviation (error) between a target and an actual supercharged pressure, multiplied by a predetermined correction coefficient which corresponds to a particular air flow rate. In this instance, it is possible to change the correction value continuously in proportion to the magnitude of the error, and hence, the acquisition time to determine an optimum value can be reduced, together with an improvement in the accuracy of setting.

In the above disclosure, supercharged pressure regulator means comprises both the variable geometry means and the exhaust gas bypass means. However, it should be understood that the invention is equally applicable where only one of these is provided.

What is claimed is:

1. A supercharge pressure control system for an internal combustion engine with a turbocharger comprising:
   means for detecting the supercharge pressure of the engine;
   regulating means having at least one of a variable geometry means and an exhaust bypass means, for regulating the supercharge pressure of the engine; and
   control means for inputting the detected supercharge pressure from the detecting means and for selecting a specific control value based on an intake air flow of the engine in accordance with an accumulated value of a difference between the detected supercharge pressure and a target supercharge pressure, said accumulated value being calculated for each of the variable geometry means and the exhaust bypass means, said control means outputting a suitable control value, based on the specific control value, for controlling the supercharge pressure to each of the variable geometry means and the exhaust bypass means.

2. A supercharged pressure control system according to claim 1 in which the suitable control value is obtained by selecting one of the suitable of control tables, and selecting a particular control value from said selected table.

3. A supercharged pressure control system according to claim 2 in which said plurality of control tables contain inflow characteristics of intake air.

4. A supercharged pressure control system according to claim 1 in which the suitable control value is obtained by correction of a predetermined basic control value.

5. A supercharged pressure control system according to claim 4 in which and the basic control value and a correction value are given in terms of inflow characteristic of intake air to the engine.

6. A supercharged pressure control system according to claim 1 in which the pressure difference is accumulated over a plurality of segmented air flow rate regions.

7. A supercharged pressure control system according to claim 1 in which said variable geometry means comprises variable value means disposed in an inlet of the turbine and said exhaust bypass means comprises variable bypass valve means disposed in an exhaust gas outlet of the engine.

8. A supercharged pressure control system according to claim 7 in which in a region where operating regions of the variable valve means and the variable bypass valve means overlap each other, the variable valve means is opened to the greatest degree allowed within a permissible range of the accumulated difference while the variable bypass valve means is closed to the greatest degree allowed within the permissible range of the accumulated difference.

9. A supercharged pressure control system according to claim 1, wherein a correction value is based on the accumulated difference value and is added to or subtracted from a duty value to obtain a new duty value.

10. A supercharged pressure control system according to claim 1, wherein a duty value is obtained by selecting one of a plurality of control tables, said selection being based upon said accumulated value, and selecting the duty value from said selected table.

11. A method for controlling a supercharge pressure in an internal combustion engine with a turbocharger, said method comprising the steps of:
  detecting the actual supercharge pressure of the engine;
  accumulating a difference between the actual supercharge pressure and a target supercharge pressure, said accumulated difference being calculated for at least one of a variable geometry means and an exhaust bypass means for regulating the supercharge pressure of the engine;
  selecting a specific control value based on an intake air flow of the engine in accordance with the accumulated difference; and
  calculating a suitable control value based on the specific control value for controlling the supercharge pressure with respect to each of the variable geometry means and the exhaust bypass means.

12. A method for controlling a supercharge pressure according to claim 11, wherein said method further comprises the steps of:
  selecting a correction value based on the accumulated difference;
  adding said correction value to a basic duty value when the actual supercharge pressure is greater than the target supercharge pressure to obtain a corrected basic duty value; and
  subtracting said correction value from the basic duty value when the actual supercharge pressure is lower that the target supercharge pressure to obtain the corrected basic duty value.

13. A method of controlling a supercharged pressure according to claim 11 in which control of the supercharged pressure regulator is achieved by selecting a specific one of a plurality of preset control tables and deriving said specific control value from the specific control table.

14. A method of controlling a supercharged pressure according to claim 11 in which control of the supercharged pressure regulator is achieved by correcting a predetermined basic control value and using the corrected basic control value.

15. A method of controlling a supercharged pressure according to claim 13 in which the plurality of control tables are based upon at least an intake air flow rate of the engine.

16. A method of controlling a supercharged pressure according to claim 11, wherein said method further comprising the steps of:
  (a) calculating an air flow rate per revolution of the engine,
  (b) calculating an accumulated difference between the actual and the target supercharged pressure over a plurality of segmented air flow rate regions,
  (c) determining a table number based upon the accumulated difference,
  (d) determining a duty value by a table lookup operation with respect to a table having the table number, said table containing predetermined duty values for selected values of the air flow rate per revolution and the number of revolutions of the engine,
  (e) and choosing the determined duty value when it is within a predetermined range and choosing either the maximum value or minimum value of the predetermined range when the determined duty value is outside of the predetermined range for use in controlling the supercharged pressure regulator means.

17. A method of controlling a supercharged pressure according to claim 11 said method further comprising the steps of:
  (a) calculating an air flow rate per revolution of the engine,
  (b) calculating the accumulated difference between the actual and the target supercharged pressure over a plurality of segmented air flow rate regions,
  (c) determining a basic duty value by a table lookup operation with respect to a table which contains predetermined duty values for selected values of the number of revolutions of the engine and the air flow rate per revolution,
  (d) and determining a correction value in accordance with the accumulated difference, and combining the correction value with the basic duty value to provide a corrected duty value which is used in controlling the supercharged pressure regulator means.

18. A method of controlling a supercharged pressure according to claim 11 in which said variable geometry means comprises variable valve means disposed in the inlet of the turbine and said exhaust bypass means comprises variable bypass valve means disposed in the exhaust gas outlet of the engine.

19. A method of controlling a supercharged pressure according to claim 18 in which a control procedure is employed where the variable valve means and the variable bypass valve means operate in an overlapped manner, the control procedure comprising the steps of:
   (a) slightly increasing the opening of the variable valve means to see if the lower limit of the supercharged pressure is determined by the variable valve means or the variable bypass valve means,
   (b) determining, when it is found at step (a) that the lower limit is determined by the variable valve means, if the accumulated difference is within a permissible range,
   (c) if it is found at step (b) that the accumulated difference is not within the permissible range, opening or closing the variable valve means until the accumulated value comes into the permissible range, and if it is found that the accumulated difference is within the permissible range, opening the variable bypass valve means as long as the accumulated difference does not decrease and closing the variable bypass valve means when the accumulated difference decreases,
   (d) if it is found at step (a) that the lower limit is not determined by the variable valve means, determining if the accumulated difference is within the permissible range,
   (e) if it is found at step (d) that the accumulated difference is not within the permissible range, opening or closing the variable bypass valve means until the accumulated difference comes into the permissible range, and
   (f) if it is found at step (d) that the accumulated difference is within the permissible range, opening the variable valve means as long as the accumulated difference does not decrease and closing the variable valve means when the accumulated difference decreases.

20. A supercharge pressure control system for an internal combustion engine with a turbocharger comprising:
   means for detecting the supercharge pressure of the engine;
   regulating means having at least one of a variable geometry means and an exhaust bypass means, for regulating the supercharge pressure of the engine; and
   control means for inputting the detected supercharge pressure from the detecting means and for selecting a specific control value based on an intake air flow of the engine in accordance with an accumulated value of a difference between the detected supercharge pressure and a target supercharge pressure, said accumulated value being calculated for each of the variable geometry means and the exhaust bypass means, said control means outputting a suitable control value which is obtained by selecting one of a plurality of control tables, and selecting the suitable control value from said selected table for controlling the supercharge pressure to each of the variable geometry means and the exhaust bypass means.

21. A supercharge pressure control system for an internal combustion engine with a turbocharger comprising:
   means for detecting the supercharge pressure of the engine;
   regulating means having at least one of a variable geometry means and an exhaust bypass means, for regulating the supercharge pressure of the engine; and
   control means for inputting the detected supercharge pressure from the detecting means and for selecting a specific control value based on an intake air flow of the engine in accordance with an accumulated value of a difference between the detected supercharge pressure and a target supercharge pressure, said accumulated value being calculated for each of the variable geometry means and the exhaust bypass means, said control means outputting a suitable control value which is obtained by correction of a predetermined basic control value, for controlling the supercharge pressure to each of the variable geometry means and the exhaust bypass means.

22. A supercharge pressure control system for an internal combustion engine with a turbocharger comprising:
   means for detecting the supercharge pressure of the engine;
   regulating means having at least one of a variable geometry means and an exhaust bypass means, for regulating the supercharge pressure of the engine; and
   control means for inputting the detected supercharge pressure from the detecting means and for selecting a specific control value based on an intake air flow of the engine in accordance with an accumulated value of a difference between the detected supercharge pressure and a target supercharge pressure, this pressure difference being accumulated over a plurality of segmented air flow rate regions, said accumulated value being calculated for each of the variable geometry means and the exhaust bypass means, said control means outputting a suitable control value, based on the specific control value, for controlling the supercharge pressure to each of the variable geometry means and the exhaust bypass means.

23. A method for controlling a supercharge pressure in an internal combustion engine with a turbocharger, said method comprising the steps of:
   detecting the actual supercharge pressure of the engine;
   accumulating a difference between the actual supercharge pressure and a target supercharge pressure, said accumulated difference being calculated for at least one of a variable geometry means and an exhaust bypass means for regulating the supercharge pressure of the engine;
   selecting a specific one of a plurality of preset control tables and deriving said specific control value from the specific control table based upon an intake air flow and the accumulated difference; and
   calculating a specific control value based on the specific control value for controlling the supercharge pressure with respect to each of the variable geometry means and the exhaust bypass means.

24. A method for controlling a supercharge pressure in an internal combustion engine with a turbocharger, said method comprising the steps of:
- detecting the actual supercharge pressure of the engine;
- accumulating a difference between the actual supercharge pressure and a target supercharge pressure, said accumulated difference being calculated for at least one of a variable geometry means and an exhaust bypass means for regulating the supercharge pressure of the engine;
- selecting a specific control value based on an intake air flow of the engine in accordance with the accumulated difference; and
- correcting a predetermined basic control value and using the corrected basic control value for controlling the supercharge pressure with respect to each of the variable geometry means and the exhaust bypass means.

25. A method for controlling a supercharge pressure in an internal combustion engine with a turbocharger, said method comprising the steps of:
- detecting the actual supercharge pressure of the engine;
- accumulating a difference between the actual supercharge pressure and a target supercharge pressure, said accumulated difference being calculated for at least one of a variable geometry means and an exhaust bypass means for regulating the supercharge pressure of the engine;
- selecting a specific control value based on an intake air flow of the engine in accordance with the accumulated difference;
- calculating a suitable control value based on the specific control value for controlling the supercharge pressure with respect to each of the variable geometry means and the exhaust bypass means;
- calculating an air flow rate per revolution of the engine;
- calculating an accumulated difference between the actual and the target supercharged pressure over a plurality of segmented air flow rate regions;
- determining a table number based upon the accumulated difference;
- determining a duty value by a table lookup operation with respect to a table having the table number, said table containing predetermined duty values for selected values of the air flow rate per revolution and the number of revolutions of the engine; and
- choosing the determined duty value it is within a predetermined range and choosing either the maximum value or minimum value of the predetermined range when the determined duty value is outside of the predetermined range for use in controlling the supercharged pressure regulator means.

26. A method for controlling a supercharge pressure in an internal combustion engine with a turbocharger, said method comprising the steps of:
- detecting the actual supercharge pressure of the engine;
- accumulating a difference between the actual supercharge pressure and a target supercharge pressure, said accumulated difference being calculated for at least one of a variable geometry means and an exhaust bypass means for regulating the supercharge pressure of the engine;
- selecting a specific control value based on an intake air flow of the engine in accordance with the accumulated difference;
- calculating a suitable control value based on the specific control value for controlling the supercharge pressure with respect to each of the variable geometry means and the exhaust bypass means;
- calculating an air flow rate per revolution of the engine;
- calculating the accumulated difference between the actual and the target supercharged pressure over a plurality of segmented air flow rate regions;
- determining a basic duty value by a table lookup operation with respect to a table which contains predetermined duty values for selected values of the number of revolutions of the engine and the air flow rate per revolution; and
- determining a correction value in accordance with the accumulated difference, and combining the correction value with the basic duty value to provide a corrected duty value which is used in controlling the supercharged pressure regulator means.

* * * * *